Nov. 10, 1953     G. H. SOUTHWORTH     2,658,687
GLASS WORKING IMPLEMENT TEMPERATURE CONTROL
Filed Jan. 9, 1948
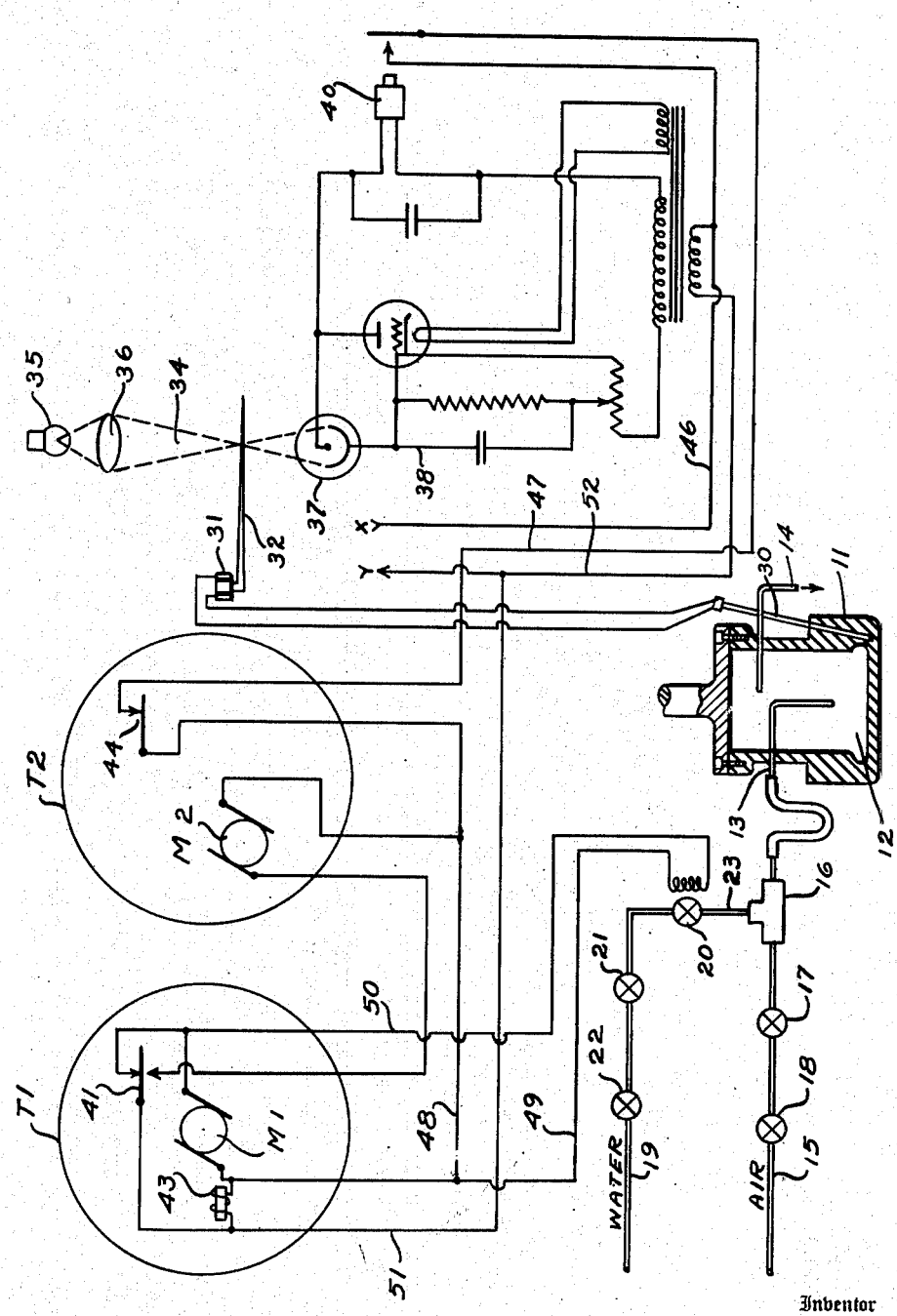
Inventor
GEORGE H. SOUTHWORTH
By
H. H. Knight
Attorney Patented Nov. 10, 1953

2,658,687

UNITED STATES PATENT OFFICE 2,658,687

GLASS WORKING IMPLEMENT TEMPERATURE CONTROL

George H. Southworth, Corning, N. Y., assignor to Corning Glass Works, Corning, N. Y., a corporation of New York Application January 9, 1948, Serial No. 1,287

5 Claims. (Cl. 236—46)

The present invention relates to equipment for maintaining a glass working implement, such for example as a plunger or mold of an automatic glass working machine within a desired temperature range, and is particularly concerned with the provision of facilities for rapidly cooling such an implement during each working cycle thereof to abstract therefrom an amount of heat substantially corresponding to that absorbed by the implement from the hot glass during such working cycle. By such facilities the implement may be maintained at its best working temperature range and practicable limitations on the frequency at which the implement may be used, predicated on temperature, are removed and maximum output per element in a given time becomes limited only by other factors. Additionally, by close control of temperature, the implement can be operated at a higher average temperature than ordinarily considered practicable. This is of particular advantage when it is desired to press articles of minimum wall thickness as there is less initial chilling of the glass by the higher temperature implement when the charge of molten glass first comes in contact with the implement.

The prime object of the invention, therefore, is the automatic maintenance of a glass working implement within a desired operating temperature range.

Another object is a glass working implement temperature control apparatus which anticipates a temperature rise, initiates a corrective measure precalculated to counteract such temperature rise and thus holds the implement within a narrow temperature range.

Another object is control apparatus wherein, in case the precalculated corrective measure is such as to produce a material over-correction, only a fraction of such corrective measure will be utilized.

Another object is a control apparatus wherein, in case a precalculated corrective measure is insufficient, a second corrective measure is initiated after a delay assuring that a further corrective measure is desirable.

Other objects and features or advantages of the invention will become apparent from the following description of an illustrative embodiment of the invention.

The accompanying drawing, partly in sectional elevation, illustrates a glass working implement containing a thermocouple and shows a diagram of associated apparatus under control of the thermocouple to apply a cooling medium to the cavity of the implement.

Referring now to the drawing in detail, the implement whose temperature is to be regulated, for example, comprises a plunger 11 having a cooling medium cavity 12 with an inlet 13 and an outlet 14 respectively. The outlet 14 is open to atmosphere, whereas inlet 13 is in communication with a fluid supply line 15 connected to a suitable compressed air source and including a pipe T 16, a check valve 17 and a shutoff valve 18. The side opening in T 16 is plugged with a section of capillary tubing 23 connected to a low pressure water supply line 19 containing a solenoid valve 20, a regulator valve 21 and a shutoff valve 22. Valve 20 controls the injection of water from the supply line 19 to an air stream continuously passing through the plunger cavity 12 from line 15. Valve 20 is under control of a thermocouple 30 contained within another cavity in plunger 11 and connected to a galvanometer 31, so that its vane 32 may be made to pass through a light beam 34 from a lamp 35 which is focused by a lens 36 upon a photocell 37. The parts are so adjusted that when the temperature of plunger 11 rises above a given value, the vane 32 moves out of the light beam and admits light to the photocell 37. The photocell, by means of the conventional vacuum tube circuit 38, operates a relay 40 which closes a circuit through valve 20 so that the valve opens permitting water to be inspirated into the air stream. The resulting water-laden air entering the plunger cavity thus rapidly absorbs heat from the plunger converting the water to steam which with the air issues from outlet 14.

The equipment as above described is insufficient alone for the satisfactory control of the plunger temperature because the lag in time for the thermocouple to sense the effect of the cooling action is such that over-cooling is likely to occur.

The foregoing faults are overcome by providing in the system two timing devices T1 and T2 respectively.

Timer T1 comprises a contactor 41 adapted to be moved from its associated break contact into engagement with its make contact by a motor M1 after the lapse of an adjustable predetermined time period and to be instantly restored upon deenergization of an associated electromagnet 43.

Timer T2 comprises contacts 44 opened by a motor M2 a predetermined time after its energization and immediately reclosed upon deenergization of the motor. Timing devices of the foregoing type equipped with time adjusting facilities are fully illustrated and discribed in catalog bulletins Nos. 800-C and 700-B respectively, published by The R. S. Cramer Company, Centerbrook, Connecticut.

The relay 40, upon operation under control of the vacuum tube circuit 38, as described, not only closes a circuit for the winding of magnetic valve 20, but also closes circuits through magnet 43 and motor M1 of timer T1.

The circuit through the winding of the magnet of valve 20 extends from a terminal X of a suitable current supply source, through conductor 46, the contacts of relay 40, conductor 47, contacts 44 of timer T2, conductors 48 and 49, the winding of valve 20, conductor 50, the back contact of contactor 41 of timer T1, conductor 51 to conductor 52 and the Y terminal of the same current source.

The circuit for magnet 43 extends from the Y terminal, over conductors 52 and 51, the magnet 43 and then joins the conductor 49 included in the first traced circuit. The motor M1 is in bridge of conductors 49 and 50 extending to the terminals of the winding of valve 20.

As will be appreciated therefore, at the instant relay 40 closes the circuit of magnet valve 20 and thus brings about its actuation to supply liquid to the air stream flowing through the T 16 into plunger 11, timer T1 begins to measure the time of operation of valve 20. At the termination of a preset time interval, the contactor 41 breaks away from its back contact and thus opens the circuit to valve 20. Valve 20 accordingly closes to cut-off the supply of liquid to T 16 and plunger 11. At the same time, timer T1 through the front contact of its contactor 41 closes a circuit through the motor M2 of timer T2 which, after a predetermined time delay, opens contacts 44 thus opening the circuit of the motor M1 and of magnet 43 to permit the timer T1 to restore its contactor 41 to its initial position, thereby opening the circuit of motor M2 to permit the associated contacts 44 to also restore.

If, after the restoration of timer T2, the thermocouple should sense that further cooling is required, relay 40 will still be energized and the cooling cycle will be again initiated.

The timers are preferably so adjusted that usually timer T1 permits just sufficient water to be injected into the air stream to extract the heat introduced into the plunger during a normal operating cycle. However, if the temperature of the thermocouple falls below the given value before the expiration of the fixed cooling period, contacts of relay 40 will open before the measured quantity of liquid has been injected into line 15 and thus open the operating circuits of valve 20, motor M1 and magnet 43, thereby causing discontinuance of the water cooling and restoration of timer T1 to normal.

It will further be noted that should the temperature of the thermocouple, during the operation of timer T2, fall below the given value, the contacts of relay 40 will open and interrupt the operating circuit for motor M2 enabling it to restore to its initial position.

It will be appreciated from the foregoing that applicant has devised a simple form of apparatus readily adaptable to the temperature control of a wide range of forms of equipment.

What is claimed is:

1. A glass working element having a cooling medium cavity with an inlet and an outlet, a line from a compressed air source connected to said inlet, a line connected with a source of cooling liquid and said first line respectively, a normally closed valve in said second specified line, a temperature change responsive device in efficient heat transfer relation with said glass working element, means under the control of said device to actuate the valve to feed liquid into said first line to augment the cooling action of the air being fed to said element by said first line and timing means also under the control of said device to disable said valve after a predetermined time period even though said device is still calling for the operation of said valve.

2. In combination, a hollow glass working element having inlet and outlet passages, a fluid supply line for continuously supplying a gaseous cooling fluid under pressure to the interior of said hollow element via the inlet passage whereby heat absorbed from the element by the fluid is driven out the outlet passage, a valved line in communication with said fluid supply line and a source of cooling liquid respectively, a temperature change responsive device arranged in efficient heat exchange relation with said element, and means under control of said device upon a predetermined increase in temperature of the element for actuating the valve in said line to inject liquid for a predetermined time interval into said fluid supply line to accelerate the rate of heat removal therefrom.

3. The combination with a device whose temperature is to be regulated, of a temperature responsive element, temperature-regulating means under control of said element to change the temperature of said device in a corrective direction, a first timing unit under control of said element adapted to disable said temperature-regulating means after a predetermined time interval, and a second timing unit under the joint control of said temperature-responsive element and said first timing unit to reinitiate an operating cycle of said first timing unit after a predetermined lapsed time.

4. The method of regulating the temperature of a hollow glass-forming element during its periodic use in the formation of glass articles, which embodies continuously passing a stream of air through the element cavity, upon the element attaining a predetermined maximum temperature inspirating water into the air stream for a time period insufficient to cool the element to its minimum desired temperature, and thereafter inspirating water into the stream at spaced time intervals until the minimum desired element temperature is attained.

5. An apparatus such as defined by claim 1, which includes a second timing means under the joint control of said temperature-responsive device and said first timing means to reinitiate an operating cycle of said first timing means after a predetermined lapsed time.

GEORGE H. SOUTHWORTH.

References Cited in the file of this patent

UNITED STATES PATENTS

| Number | Name | Date |
|---|---|---|
| 856,067 | Johns | June 4, 1907 |
| 1,057,198 | Winder | Mar. 25, 1913 |
| 2,055,641 | Young | Sept. 29, 1936 |
| 2,167,919 | Wadsworth | Aug. 1, 1939 |
| 2,278,242 | Chapman | Mar. 31, 1942 |
| 2,359,651 | Krogh | Oct. 3, 1944 |
| 2,387,562 | Brunot | Oct. 23, 1945 |
| 2,394,061 | Horstkotte | Feb. 5, 1946 |
| 2,410,616 | Webb | Nov. 5, 1946 |
| 2,431,473 | Flynn | Nov. 25, 1947 |
| 2,468,288 | Booth | Apr. 26, 1949 |
| 2,573,041 | May | Oct. 30, 1951 |